United States Patent
Helfer et al.

(10) Patent No.: US 9,587,747 B2
(45) Date of Patent: Mar. 7, 2017

(54) FLEXIBLE SEALS FOR PROCESS CONTROL VALVES

(71) Applicant: Fisher Controls International LLC, Marshalltown, IA (US)

(72) Inventors: Wade Jonathon Helfer, Ames, IA (US); David John Koester, Marshalltown, IA (US); Benjamin Uriah Good, Marshalltown, IA (US); Paul Russell Dalluge, Indianola, IA (US); Andrew John Olson, Vail, AZ (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/842,281

(22) Filed: Sep. 1, 2015

(65) Prior Publication Data

US 2015/0369371 A1    Dec. 24, 2015

Related U.S. Application Data

(63) Continuation of application No. 13/595,720, filed on Aug. 27, 2012, now Pat. No. 9,127,775, which is a
(Continued)

(51) Int. Cl.
*F16K 1/22* (2006.01)
*F16K 1/226* (2006.01)

(52) U.S. Cl.
CPC ......... *F16K 1/2261* (2013.01); *F16K 1/2266* (2013.01)

(58) Field of Classification Search
CPC ............... F16K 1/226–1/2263; F16K 1/2266
(Continued)

(56) References Cited

U.S. PATENT DOCUMENTS 3,144,040 A   8/1964   White
3,211,421 A   10/1965  Johnson, Jr. et al.
(Continued)

FOREIGN PATENT DOCUMENTS

CN    2135699 Y    6/1993
DE    921697       12/1954
(Continued)

OTHER PUBLICATIONS

Crane Company, "Flowseal High Performance Butterfly Valves," The Expert Document No. GV-501A, Apr. 2003, 28 pages.
(Continued)

*Primary Examiner* — John Bastianelli
(74) *Attorney, Agent, or Firm* — Hanley, Flight & Zimmerman, LLC

(57) ABSTRACT

Flexible seals for process control valves are disclosed. An example disclosed seal includes a seal for use with a butterfly valve. The example seal includes a substantially flexible ring-shaped carrier configured to be moveably fixed within the butterfly valve and to surround a flow control aperture therein. The example seal includes a seal stiffener adjacent the substantially flexible ring-shaped carrier to increase the stiffness of the substantially flexible ring-shaped carrier in a first flow direction. The example seal includes a substantially rigid seal ring to engage an opposing surface.

11 Claims, 10 Drawing Sheets

Related U.S. Application Data continuation of application No. 11/741,258, filed on Apr. 27, 2007, now Pat. No. 8,286,938, which is a continuation-in-part of application No. 11/313,364, filed on Dec. 21, 2005, now abandoned.

(58) Field of Classification Search
USPC ....... 251/305–308, 314, 316, 174, 180, 192, 251/359–363
See application file for complete search history.

(56) References Cited

U.S. PATENT DOCUMENTS

| | | | |
|---|---|---|---|
| 3,282,555 A | 11/1966 | Mallonee, II et al. | |
| 3,338,584 A | 8/1967 | Nakanishi et al. | |
| 3,394,915 A | 7/1968 | Gachot | |
| 3,642,248 A | 2/1972 | Benware | |
| 3,650,508 A | 3/1972 | Kosmala et al. | |
| 3,698,686 A | 10/1972 | Williams | |
| 3,997,142 A | 12/1976 | Broadway | |
| 4,000,848 A | 1/1977 | Braukmann et al. | |
| 4,003,394 A | 1/1977 | Adams | |
| 4,005,848 A | 2/1977 | Eggleston | |
| 4,113,268 A * | 9/1978 | Simmons | F16K 1/2266 251/306 |
| 4,114,856 A | 9/1978 | MacAfee et al. | |
| 4,162,782 A | 7/1979 | Wilkins | |
| 4,175,578 A | 11/1979 | Priese | |
| 4,194,749 A | 3/1980 | Bonafous | |
| 4,202,365 A | 5/1980 | Aoki et al. | |
| 4,244,387 A | 1/1981 | Snape | |
| 4,269,391 A | 5/1981 | Saito et al. | |
| 4,271,858 A | 6/1981 | Snape et al. | |
| 4,272,054 A | 6/1981 | Zinnai | |
| 4,293,116 A | 10/1981 | Hinrichs | |
| 4,293,166 A | 10/1981 | Ernst et al. | |
| 4,396,199 A | 8/1983 | Boyd et al. | |
| 4,398,695 A | 8/1983 | Torche | |
| 4,418,889 A | 12/1983 | Krause | |
| 4,487,216 A | 12/1984 | Barker et al. | |
| 4,491,298 A | 1/1985 | Beauchamp et al. | |
| 4,502,663 A | 3/1985 | Huber | |
| 4,505,290 A | 3/1985 | Scobie | |
| 4,513,946 A | 4/1985 | Priese | |
| 4,552,335 A * | 11/1985 | Alexander | F16K 5/0673 251/315.05 |
| 4,582,080 A | 4/1986 | Stock | |
| 4,623,121 A | 11/1986 | Donnelly | |
| 4,632,360 A | 12/1986 | DeSalve | |
| 4,890,816 A | 1/1990 | Nicholson | |
| 4,898,363 A | 2/1990 | Burton | |
| 4,944,489 A | 7/1990 | Adams et al. | |
| 5,069,240 A | 12/1991 | Kurkjian, Jr. | |
| 5,099,886 A | 3/1992 | Squirrell | |
| 5,178,364 A | 1/1993 | Garrigues et al. | |
| 5,357,997 A | 10/1994 | Brueggestrath | |
| 5,419,532 A * | 5/1995 | Fan | F16K 5/0673 251/315.08 |
| 5,535,986 A | 7/1996 | Hutchens et al. | |
| 5,542,684 A | 8/1996 | Squirrell | |
| 5,685,520 A | 11/1997 | Velan | |
| 5,865,422 A | 2/1999 | Barker et al. | |
| 5,934,647 A | 8/1999 | Marbach | |
| 6,027,126 A | 2/2000 | Peterschmitt et al. | |
| 6,116,575 A | 9/2000 | Ahn | |
| 6,206,376 B1 | 3/2001 | Hartman et al. | |
| 6,213,141 B1 | 4/2001 | Eggleston | |
| 6,641,141 B2 | 11/2003 | Schroeder | |
| 2005/0248095 A1 | 11/2005 | Olberding et al. | |

FOREIGN PATENT DOCUMENTS

| | | |
|---|---|---|
| DE | 8411124 | 8/1985 |
| EP | 160828 | 11/1985 |
| EP | 0472910 | 3/1992 |
| EP | 0475070 | 3/1992 |
| ES | 2057678 | 10/1994 |
| ES | 2064018 | 1/1995 |
| FR | 1572497 | 6/1969 |
| FR | 2770274 | 4/1999 |
| GB | 2219650 | 12/1989 |
| JP | 39-10792 | 12/1961 |
| JP | 60-14666 | 6/1983 |
| JP | 01098771 | 4/1989 |
| JP | 2001-012620 | 1/2001 |
| WO | 9532377 | 11/1995 |
| WO | 02075185 | 9/2002 |

OTHER PUBLICATIONS

Emerson Process Management, "Type 8510 and 8510 Eccentric Disk Control Valves (EMA)," Product Bulletin, Sep. 2002, 20 pages.

Fisher Controls International, "High Performance Butterfly Valves," Fisher-Rosemount Product Flier PF51.6:8510B, Mar. 1997, 20 pages.

Velan,"Torqseal Triple-Offset Metel-Seated Butterfly Valves," VELAN Condensed Catalog, 2003, 23 pages.

"A41 Valve," Emerson Product Bulletin 21.1:A41, Sep. 2002, 2 pages.

"Fire Tested High Performance Butterfly Valves Features and Benefit," XOMOX Process Valves and Actuators, Jul. 17, 2003, 2 pages.

Fisher Controls International, "8510/8510B Valve," Emerson Product Bulletin 51.6:edisc (EMA), Aug. 2004, 1 page.

English Summary of First office action written in connection with Mexican Patent Application No. MX/a/2009/011517, on Aug. 7, 2012, 3 pages.

The Notification of the First Office Action, issued by the State Intellectual Property Office of P.R. China, in connection with Chinese Application No. 200880012816.9, on Sep. 9, 2010, 7 pages.

The Notification of the First Office Action, issued by the State Intellectual Property Office of P.R. China, in connection with Chinese Application No. 200580015087.9, on Apr. 11, 2008, 12 pages.

Notice of Reasons for Rejection, issued by the Japanese Patent Office in connection with Japanese Patent Application No. 2010-506489, on Oct. 16, 2012, 5 pages.

Written Opinion of the International Searching Authority, issued by the International Searching Authority in connection with International Application No. PCT/US2005/010440, on Jun. 29, 2005, 7 pages.

International Search Report, issued by the International Searching Authority on Jun. 29, 2005, in connection with International Application No. PCT/US2005/010440, 4 pages.

Office Action, issued by the United States Patent and Trademark Office on Oct. 28, 2009, in connection with U.S. Appl. No. 11/741,258, 7 pages.

Final Office Action, issued by the United States Patent and Trademark Office on May 17, 2010, in connection with U.S. Appl. No. 11/741,258, 12 pages.

Notice of Allowance, issued by the United States Patent and Trademark Office on May 21, 2012, in connection with U. S. Appl. No. 11/741,258, 5 pages.

Notice of Allowance, issued by the United States Patent and Trademark Office on Sep. 18, 2012, in connection with U.S. Appl. No. 11/741,258, 2 pages.

Restriction/Election Requirement, issued by the United States Patent and Trademark Office in connection with the U.S. Appl. No. 11/313,364, on Sep. 19, 2008, 8 pages.

Office action, issued by the United States Patent and Trademark Office in connection with the U.S. Appl. No. 11/313,364, on Jan. 5, 2009, 15 pages.

Final rejection, issues by the United States Patent and Trademark Office in connection with the U.S. Appl. No. 11/313,364, on Jul. 17, 2009, 13 pages.

Advisory action, issued by the United States Patent and Trademark Office in connection with the U.S. Appl. No. 11/313,364, on Sep. 17, 2009, 3 pages.

(56) References Cited

OTHER PUBLICATIONS

Restriction/Election Requirement, issued by the United States Patent and Trademark Office in connection with the U.S. Appl. No. 10/842,679, on Feb. 3, 2006, 9 pages.
Office action, issued by the United States Patent and Trademark Office in connection with the U.S. Appl. No. 10/842,679, on May 25, 2006, 9 pages.
Final rejection, issued by the United States Patent and Trademark Office in connection with the U.S. Appl. No. 10/842,679, on Nov. 15, 2006, 9 pages.
Advisory action, issued by the United States Patent and Trademark Office in connection with the U.S. Appl. No. 10/842,679, on Jan. 31, 2007, 3 pages.
Office action, issued by the United States Patent and Trademark Office in connection with the U.S. Appl. No. 10/842,679, on Jun. 7, 2007, 10 pages.
Final rejection, issued by the United States Patent and Trademark Office in connection with the U.S. Appl. No. 10/842,679, on Mar. 17, 2008, 8 pages.
Notice of allowance and fee(s) due, issued by the United States Patent and Trademark Office in connection with the U.S. Appl. No. 10/842,679, on May 23, 2008, 8 pages.
Notice of allowance and fee(s) due, issued by the United States Patent and Trademark Office in connection with the U.S. Appl. No. 10/842,679, on Sep. 22, 2008, 4 pages.
Office action, issued by the United States Patent and Trademark Office in connection with the U.S. Appl. No. 13/595,720, on Feb. 5, 2015, 14 pages.
Notice of allowance and fee(s) due, issued by the United States Patent and Trademark Office in connection with the U.S. Appl. No. 13/595,720, on May 1, 2015, 8 pages.

\* cited by examiner

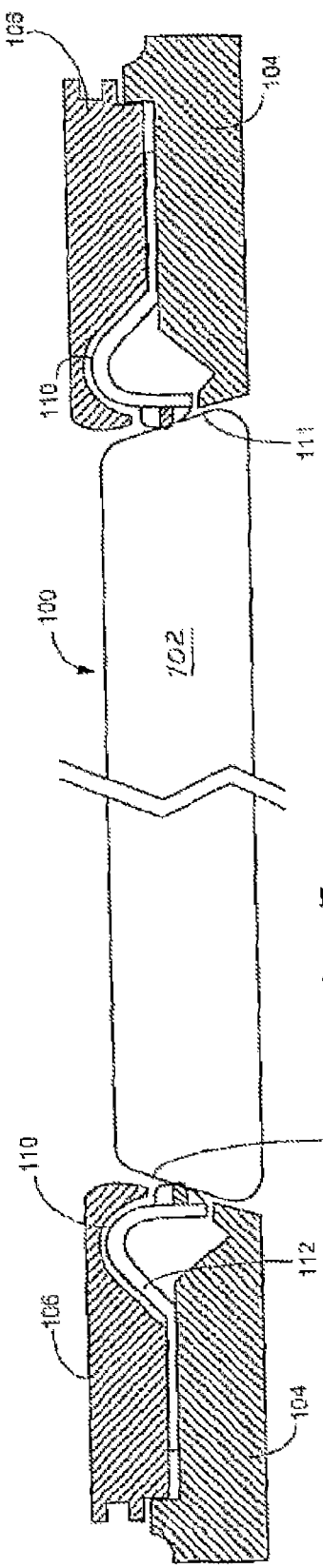

FLEXIBLE SEALS FOR PROCESS CONTROL VALVES

RELATED APPLICATIONS

This patent arises from a continuation of U.S. patent application Ser. No. 13/595,720, filed on Aug. 27, 2012 and entitled "Flexible Seals for Process Control Valves," which is a continuation of U.S. patent application Ser. No. 11/741,258 (now U.S. Pat. No. 8,286,938), filed on Apr. 27, 2007 and entitled "Flexible Seals for Process Control Valves," which is a continuation-in-part of U.S. patent application Ser. No. 11/313,364, filed on Dec. 21, 2005 and entitled "Flexible Seals for Process Control Valves." U.S. patent application Ser. Nos. 13/595,720; 11/714,258; and 11/313,364 are hereby incorporated by reference in their entireties.

FIELD OF THE DISCLOSURE

This disclosure relates generally to seals, and, more particularly, to flexible seals for use with process control valves.

BACKGROUND

Typically, it is necessary to control process control fluids in industrial processes, such as oil and gas pipeline distribution systems and chemical processing plants. In some industrial processes, butterfly valves are used to control the flow of process fluid. Generally, the industrial process conditions, such as pressure conditions, operational temperatures, and the process fluids dictate the type of valve components, including the types of butterfly valve seals that may be used.

A portion of a known butterfly valve 50 is shown in FIG. 1. The butterfly valve 50, which may be, for example, the 8510 valve made by Fisher®, a division of Emerson Process Management of St. Louis, Mo., uses a polytetrafluoroethylene (PTFE) seal. In a typical PTFE seal, a PTFE seal ring 52 is secured in a valve body 54. The PTFE seal ring 52 makes contact with a disc 56 when the valve 50 is closed to form a seal therebetween. PTFE seals, such as that depicted in FIG. 1, provide excellent sealing performance compared to metal seals and provide a relatively long seal life. PTFE seals also provide a reduction in the amount of torque needed to unseat a disc (e.g., the disc 56) from the seal (e.g., the seal ring 52), but are limited to process applications that expose the seal to temperatures below 450 degrees Fahrenheit.

Graphite laminated seals, such as a seal 62 used in a butterfly valve 60 of FIG. 2 are also known. The graphite laminated seal 62 of FIG. 2 is generally used in butterfly valves known as triple offset valves. Compared to conventional double offset valves, triple offset valves typically have a larger offset between the center of rotation of the valve shaft (not shown) and the center of rotation of a disc 64. The offset causes the disc 64 and the seal 62 to travel along an eccentric path as the disc 64 moves into and away from a seat 66, thereby substantially reducing the contact region of the expanded graphite laminate seal 62 and the seat 66 during closure. As further distinguished from a double offset valve, the cross-section of the disc 64 of the triple offset valve 60 is typically elliptical rather than circular to further reduce contact area between the seal 62 and the seat 66 near closure. As is known, the triple offset valve 60 is configured to reduce wear in any applications (e.g., throttling or on-off) by reducing the contact or engagement area between the seal 62 and the seat 66 when the disc 64 and the seal 62 are unseated (i.e., operating near the seat 66 when opening or closing).

Generally, the seal 62 is rigidly attached to the disc 64 and the seat 66 is integral to the valve body 68. Triple offset designs such as that shown in FIG. 2 can be disadvantageous due to the high torque required to drive the disc 64 and the seal 62 into and away from the seat 66 to ensure tight shutoff. Additionally, this type of seal is difficult to maintain. For example, if there is any damage to the seat 66, which is integral to the valve body 68, the valve body 68 also requires repair or replacement.

Metal seals have also traditionally been used in butterfly valves. One such metal seal, which is shown in the portion of a valve 70 shown in FIG. 3, is the metal seal used in the 8510B valve also made by Fisher®, a division of Emerson Process Management of St. Louis, Mo. In the seal shown in FIG. 3, a cantilevered metal seal ring 72 contacts a disc 74 to form a seal therebetween. Metal seals are well suited for use with high temperature and high pressure process applications, but generally are more susceptible to wear and, thus, require greater maintenance and incur greater cost.

There have been numerous attempts to combine the characteristics of at least two of the known seal types previously described. One such attempt is shown in FIG. 4, which illustrates a portion of a valve 80 with the fire safe seal by Xomox® of Cincinnati, Ohio. The fire safe seal illustrated in FIG. 4 combines elements of a PTFE seal and a metal seal. As depicted in FIG. 4, a primary PTFE seal 82 is retained within a receiving channel 84 of a secondary metal seal 86. The fire safe seal is retained within a valve body 88 by a seal ring retainer 90 and is configured so that upon retention within the valve body 88 a preload of the fire safe seal results in a bend or flexure 92 in the metal seal 86 similar to that of a belleville washer. This preload creates a spring force so that when a disc 94 contacts the seal, the spring force drives the fire safe seal into contact with the disc 94 and a fluid seal is formed between the PTFE seal component 82 and the disc 94. In operation, the primary PTFE seal component 82 is sacrificial. For example, in the case of a fire where temperatures surrounding the PTFE seal component 82 exceed 450 degrees Fahrenheit, the PTFE component 82 may be consumed (i.e., sublimated or burned), but the spring force provided via the flexure 92 causes the metal seal 86 to contact the disc 94 to maintain the fluid seal therebetween. However, the type of fire safe seal depicted in FIG. 4 is susceptible to fatigue failures at the flexure 92.

SUMMARY

In accordance with one example, a seal for use with a butterfly valve includes a substantially flexible ring-shaped carrier configured to be fixed within the butterfly valve and to surround a flow control aperture therein. The seal also includes a ring-shaped cartridge coupled to an inner diameter of the ring-shaped carrier. The cartridge includes a first portion and a second portion coupled to the first portion to define a circumferential opening to hold a seal ring.

In accordance with another example, a seal for use with a butterfly valve includes a cartridge having a first ring-shaped portion and a second ring-shaped portion coupled to the first ring-shaped portion to define an opening. Additionally, a substantially rigid ring-shaped seal is retained in the opening.

BRIEF DESCRIPTION OF THE DRAWINGS

FIG. 5 is a cross-sectional view of a portion of a butterfly valve including an example seal having a rigid seal ring fixed to a flexible seal carrier.

FIG. 6 is an enlarged cross-sectional view of the example seal ring and seal carrier of FIG. 5.

FIG. 7 is an enlarged cross-sectional view of an alternative seal configuration that may be used to implement the example seal of FIG. 5.

FIG. 8 is an enlarged cross-sectional view of another alternative seal configuration that may be used to implement the example seal of FIG. 5.

DETAILED DESCRIPTION

Figure 1:
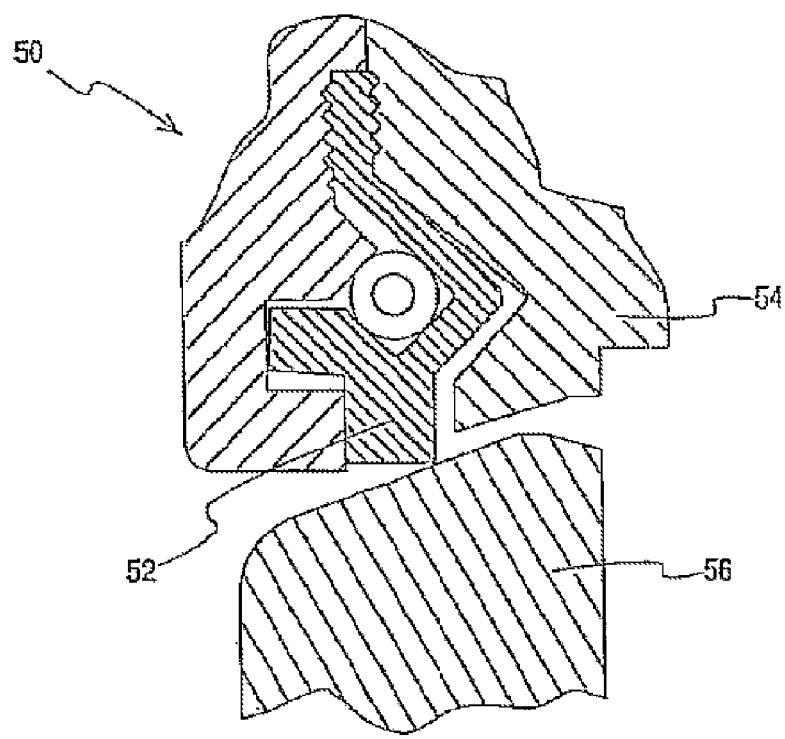
FIG. 1 is a cross-sectional view of a portion of a known PTFE butterfly valve seal.
Figure 2:
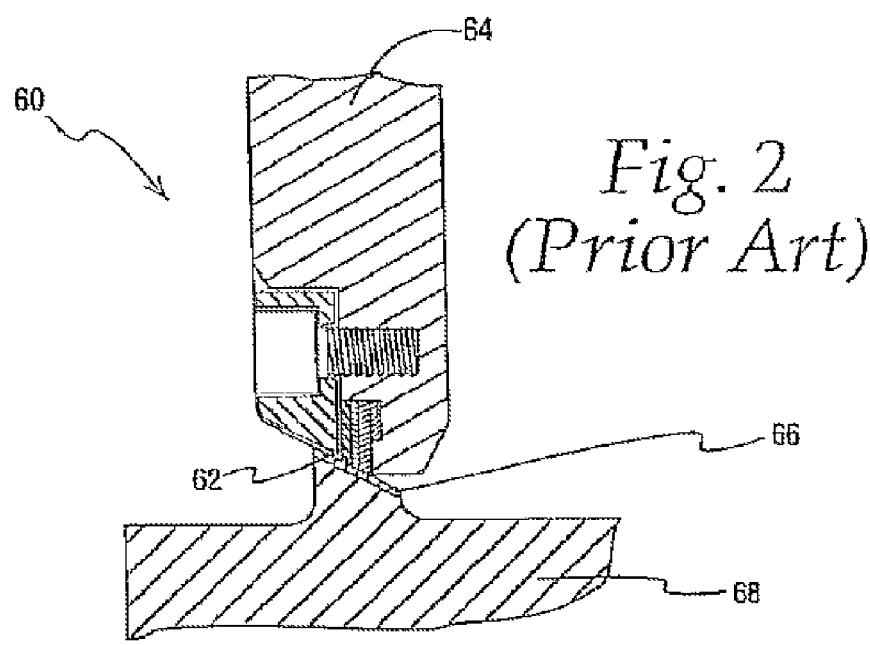
FIG. 2 is a cross-sectional view of a portion of a known graphite laminated seal for use in a triple offset butterfly valve.

FIG. 5 is a cross-sectional view of a portion of an example butterfly valve 100. The butterfly valve 100 shown in FIG. 5 may, for example, be used to control process fluids, such as natural gas, oil, water, etc. over a wide range of temperatures. As shown in FIG. 5, the butterfly valve 100 includes a disc 102 (e.g., a movable flow control member) at which a relatively high pressure fluid may be presented. The butterfly valve 100 also includes a valve body 104 and a retainer or protector ring 106 coupled to the valve body 104. The protector ring 106 retains a seal 110 to form a fluid seal between the disc 102 and the seal 110.

The disc 102 is mounted within the valve 100 via a valve shaft (not shown). To control the flow of process fluid through the valve 100, a control valve instrument (not shown) is operatively coupled to the valve 100 and generally provides a pneumatic signal to the valve actuator (not shown) in response to a control signal from a process controller, which may be part of a distributed control system (neither of which are shown). The valve actuator is coupled to the valve shaft and as the pneumatic signal moves the valve actuator, the valve shaft and the disc 102 attached thereto rotate so that a contoured edge 111 of the disc 102 is positioned relative to the seal 110 (e.g., in an open position) at an angle proportional to the control signal. The disc 102 may also be rotated to a closed position (e.g., the contoured edge 111 of the disc 102 may be brought into contact with the seal 110) to form a fluid seal. In other words, a fluid seal is formed between the disc 102 and the seal 110 when the disc 102 is rotated to a closed position and contacts the seal 110. The seal 110 may be configured to have an inner diameter to form an interference fit with the average diameter of the disc 102.

Additionally, the protector ring 106 is configured to provide simplified maintenance access to the seal 110 for replacement and prevents direct exposure of process fluid to the seal 110. The example clamped design depicted in FIG. 5 advantageously provides a seal between the protector ring 106, the valve body 104, and the seal 110 by creating intimate contact therebetween to substantially prevent the flow of process fluid between the protector ring 106 and the valve body 104 (i.e., leakage past the disc 102). Additionally, gaskets (not shown) may be provided adjacent to the protector ring 106, the valve body 104, and the seal 110, to improve seal performance.

FIG. 6 is an enlarged view of a portion of the example seal 110 of FIG. 5. The example seal 110 includes a substantially flexible carrier 112, which has, for example, a curved profile or any other profile that may impart flexibility to the flexible carrier 112. The example seal 110 also includes a substantially rigid seal ring 114 having an outer circumferential surface 113 that contacts the flexible carrier 112 and an inner circumferential surface 115 configured to contact and sealingly engage the disc 102 (FIG. 5). The flexible carrier 112 enables the substantially rigid seal ring 114 to substantially follow the movement of the disc 102 near closure of the valve 100. Thus, when the disc 102 is subjected to large pressure drops and any deflection or movement of the disc 102 occurs, the seal 110 can move with the disc 102 to maintain sealing contact. The flexible carrier 112 also provides a static seal between the protector ring 106 and the valve body 104 to prevent leakage around the seal 110. In contrast to some known floating designs, the example seal 110 is a clamped design in which the flexibility of the carrier 112 and the rigidity of the ring 114 may be controlled independently.

As shown in FIG. 6, the example seal ring 114 is a layered structure. In the example of FIG. 6, outer layers 116 comprise a substantially or relatively rigid material such as a metal. In one particular example, the outer layers 116 are made of stainless steel. However, other and/or additional materials could be used instead. The outer layers 116 provide rigidity to the seal ring 114 to enable generation of sealing forces required to affect a seal against the disc 102 when the disc (e.g., the disc 102) is in sealing engagement with the seal ring 114. The cross-section (e.g., the thickness or cross-sectional area) of the outer layers 116 may be varied to adjust the rigidity of the seal ring 114.

Adjacent to each of the outer layers 116 is a relatively thin layer of expanded graphite 118, which may be implemented using a reinforced carbon fiber material. The expanded graphite 118 is primarily used to bind or affix a central layer 120 disposed between the expanded graphite layers 118 to the seal 110. The central layer 120 provides the primary seal, and may be made of a polymer such as, for example, PTFE.

In the illustrated example of FIG. 6, a secure bond is formed between the outer layers 116 and the expanded graphite layers 118 using, for example, an adhesive such as a phenolic adhesive. The central layer 120 is bonded to the expanded graphite layers 118 using a thermo-compressive process in which elevated temperatures permit the central layer 120 to flow into interstices on the adjoining surface(s) (i.e., the graphite layers 118) with high compressive loads forming a mechanical bond. After the layers 116, 118 and 120 are bonded, an additional load is applied to the seal ring 114 to compress the expanded graphite layers 118. In one example, the expanded graphite layers 118 are compressed to, for example, about 47% of their original thickness. The compression of the expanded graphite layers 118 provides an initial gasket-seating load to prevent leakage or seepage through the expanded graphite layers 118 in operation. In one example, a load of about 5,000 pounds per square inch may be used to compress the expanded graphite layers 118.

After the layers 116, 118 and 120 are bonded and the load is applied to compress the expanded graphite layers 118, the outer circumferential surface 113 of the seal ring 114 is coupled to a flush side 122 of the seal carrier 112. The seal ring 114 may be coupled to the flush side 122 by, for example, a laser weld at each of the outer layers 116. However, any other mechanical, metallurgical, and/or chemical fastening techniques may be used instead of or in addition to welds.

FIG. 7 shows an alternative example laminated expanded graphite seal 150 that can be used as the seal 110 (FIG. 6). Many of the features of the seal 150 are similar to the seal 110, with a few distinctions. Similar to the seal 110, the seal 150 also includes a flexible carrier 152, which has, for example, a curved profile and flush side 154. The example seal 150 includes a rigid seal ring 156 that has an outer circumferential surface 155 that contacts the flexible carrier 152 and an inner circumferential surface 157 configured to contact a disc (e.g., the disc 102 of FIG. 5). The seal ring 156 also includes multiple layers. Outer layers 158 may be made of a metal such as, for example, stainless steel. As with the example seal 110 (FIG. 6), the outer layers 158 provide rigidity to the seal ring 156 to enable development of the required sealing forces when sealingly engaged with a disc. The thickness of the outer layers 158 can be varied to control the rigidity of the seal ring 156.

Between the outer layers 158 are three layers of expanded graphite 160, which may be implemented using reinforced carbon fiber, in alternating relation to two layers 162 of either a metal or a polymer such as, for example, stainless steel or PTFE. The metal or polymer layers 162 may prevent adhesion and/or transfer of the graphite material in the expanded graphite layers 160 to a disc (e.g., the disc 102) or any other flow control member. When the layers 162 are made of polymers, the layers 162 may provide lubrication to prevent material transfer from the expanded graphite layers 160 to the disc 102. When the layers 162 are made of metal, the layers 162 may provide a scraping action to substantially reduce material adhesion of the expanded graphite layers 160 to a disc or other flow control member.

The attachment method for the layers 158, 160, and 162 is dependent upon the layers 162. When the layers 162 of the seal 150 are polymer layers, they are bonded in a manner similar to the layers 116, 118, and 120 of the seal 110, as described above. When the layers 162 of the seal 150 are metallic layers, such as stainless steel, all the layers are bonded using an adhesive, such as a phenolic adhesive. In addition, the seal ring 156 is coupled to the flexible carrier 152 in a manner similar to the manner in which the ring 114 is coupled to the carrier 112, as described above in connection with FIG. 6.

FIG. 8 is an example metal seal 180 that can be used in the example valve 100 of FIG. 5 in a manner similar to the example seal 110. The example seal 180 includes a flexible seal carrier 182, which has, for example, a curved profile or any other profile suitable to provide a flexure, and a rigid seal ring 184 that has an inner circumferential surface 186 and an outer circumferential surface 188. The outer circumferential surface 188 is coupled to a flush side 190 of the seal carrier 182. The example seal ring 184 is made of a metal such as, for example, stainless steel. The rigidity of the seal ring 184 is a function of the cross-sectional area of the seal ring 184. Specifically, the greater the cross-sectional area of the seal ring 184, the more rigid the seal ring 184 becomes. The example metal seal 180 enables the use of a variety of materials for the seal ring 184 and the carrier 182, such as, for example, nickel-chromium alloys or other corrosion resistant materials. Additionally, the use of dissimilar metals for the seal ring 184 and the carrier 182 enables the use of a fatigue resistant material for the carrier 182, such as S31600 SST and the use of a wear resistant material, such as Alloy 6, for the seal ring 184. Similar to the example seals 110 and 150, the example metal seal 180 is a clamped design in which the flexibility of the carrier 182 and the rigidity of the ring 184 may be controlled independently.

In the example seals 110, 150 and 180 of FIGS. 6-8, the hoop stresses, presented by disc-seal engagement, may induce the example seals 110, 150, and 180 to conform to the shape of the disc 102 to maintain the dynamic seal during disc movement near closure. The disc 102 and/or seal rings 114, 156, and 184 may have a circular and/or elliptical shape. With an elliptically-shaped disc or seal rings, the interference between the disc 102 and the seals 110, 150, and 180 may be substantially zero in an area over or adjacent to the valve shaft.

Though an elliptical shape is discussed above, the shape may be modified slightly from a true ellipse to limit contact between the disc 102 and the seals 110, 150, and 180 to the last few degrees of rotation. In addition, other shapes may be utilized for either the disc 102 and/or the seals 110, 150, and 180 to optimize the geometry of the disc 102 to suit the needs of a particular application.

The perimeter of the disc 102 can be designed to have no interference with the seal 110, 150, and 180 near the axis of rotation of the disc 102 and a desired amount of interference with the seal 110, 150, and 180 at the axis 90° to the shaft and all points in between. The profile of the disc 102 may also be designed so that the interference is substantially the same on both sides of the perimeter of the disc 102 as the disc 102 is closed. These design options may enable the interference between the disc 102 and the seal 110, 150, and 180 to take place in only the last few degrees of closure, thereby eliminating or minimizing wear in the area near the axis of rotation of the disc 102. The hoop stress that is developed in the last few degrees of rotation provides the loading needed to obtain a seal in the area near the axis of rotation.

Figure 9:
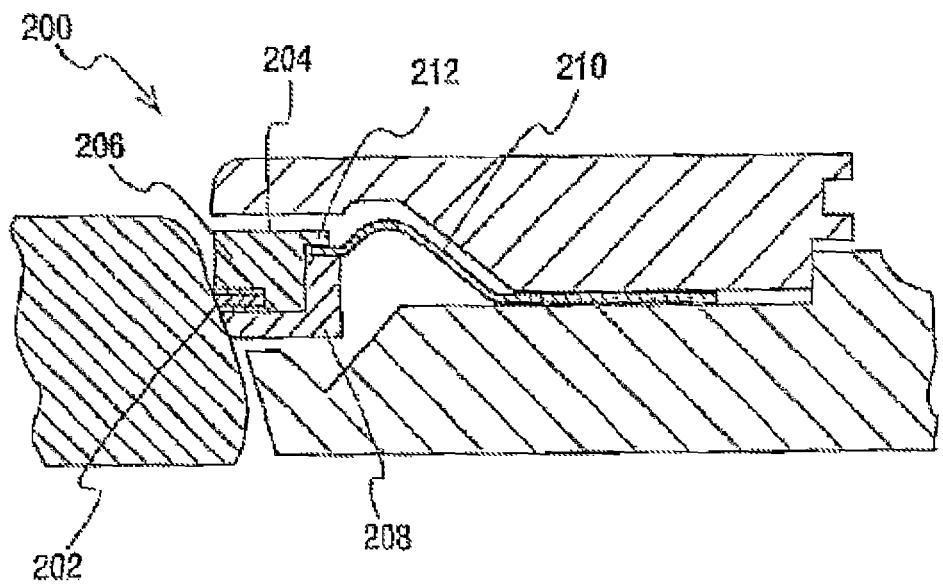
FIG. 9 is a cross-sectional view of a portion of a butterfly valve including a cartridge to couple a seal ring to a flexible seal carrier.

FIG. 9 shows a cross-sectional view of a portion of a butterfly valve 200 that has a seal ring 202 coupled via a cartridge 204 to a flexible seal carrier 210. The valve 200 operates in a substantially similar manner to the valve 100 described above. The example cartridge 204 is made of an upper portion 206 and a lower portion 208. The seal ring 202 is inserted between the upper portion 206 and the lower 208 portion, which are press-fitted until the assembly is solid. The cartridge 204 is coupled to the carrier 210 via, for example, a laser weld. However, any other mechanical, metallurgical, and/or chemical fastener may be used instead of or in addition to a weld. In the example of FIG. 9, only one laser weld is used to couple the components 206, 208, and 210. The cantilevered profile of the carrier 210 in this example increases the flexibility of the carrier 210. While the example carrier 210 is coupled to the cartridge 204 near the top of the cartridge 204 under a flange 212, the carrier 210 may be coupled to the cartridge 204 at a different point. If the carrier 210 and the cartridge 204 are coupled at a different point (i.e., different than what is depicted in FIG. 9), the shape of the upper 206 and the lower 208 portions may be altered so that the components 206, 208, and 210 could be coupled using one weld.

The upper 206 and the lower 208 portions of the cartridge 204 may be made of a metal such as, for example, stainless steel. The seal ring 202 is a layered structure similar to any of the layered structures described above. In addition, the seal ring 202 may also be a solid structure such as, for example, a solid piece of expanded graphite.

The use of the cartridge 206 to couple the seal ring 202 to the carrier 210 significantly strengthens the support of the seal ring 202. In particular, the increased metal mass provided by the cartridge 206 helps hold the layers of the seal ring 202 together. The support provided by the cartridge 204 increases the load the seal is able to withstand without leakage.

Figure 10:
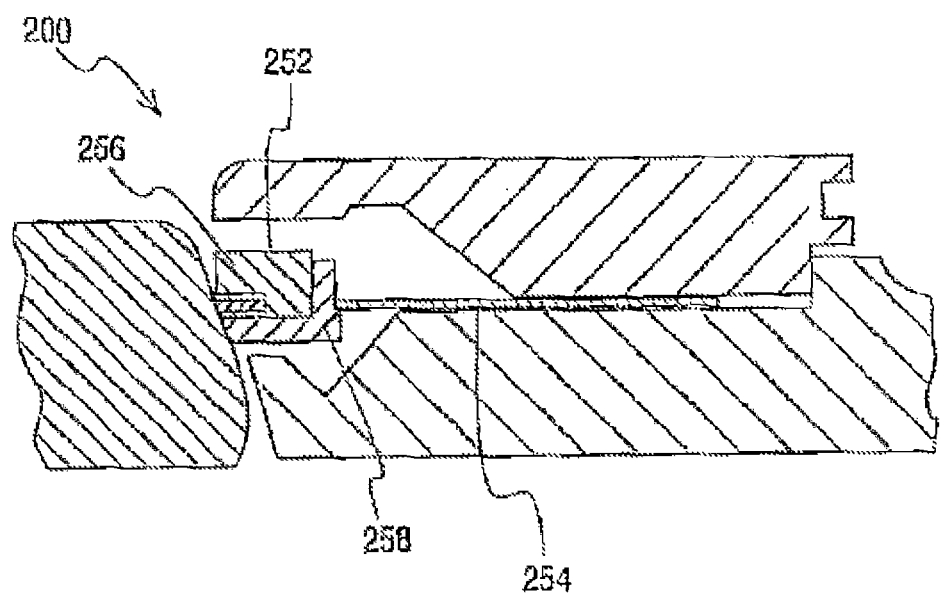
FIG. 10 is a cross-sectional view of a portion of the butterfly valve of FIG. 9 depicting an alternative cartridge to couple a seal ring to a flexible seal carrier.

FIG. 10 illustrates a cross-sectional view of the example valve 200 of FIG. 9 with an alternative cartridge 252 and carrier 254. The cartridge 252 in this example also has an upper 256 and a lower 258 portion, but the upper 256 and the lower 258 portions are shaped differently than the upper 206 and lower 208 portions of the example cartridge 204 of FIG. 9. The upper 256 and lower 258 portions are shaped differently than those depicted in FIG. 9 because the carrier 254 is substantially flat and is coupled to the cartridge 252 lower on the cartridge 252. Consequently, there is no need for a flange on the upper 256 portion. Also, the flat profile of the carrier 254 reduces tooling costs associated with its manufacture in comparison to the carrier 210, which has a curved profile and, thus, requires a die. The shape of components of the valve 200 shown in either of the examples of FIGS. 9 and 10 can be designed and manufactured substantially similarly to those of the valve 100, as described above.

Figure 3:
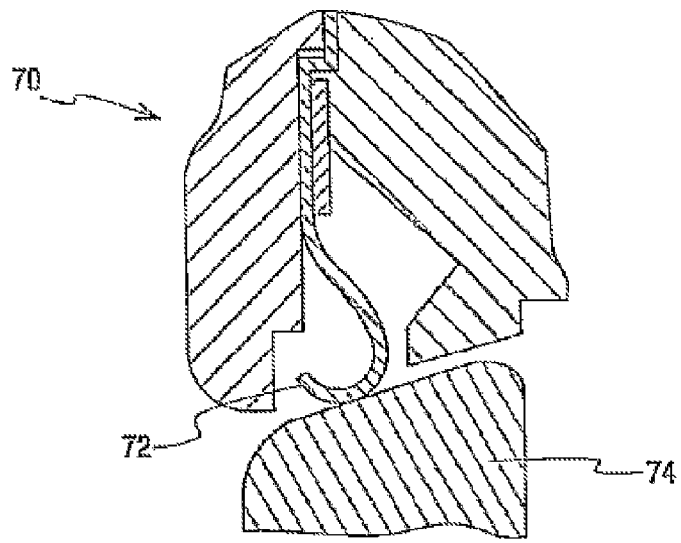
FIG. 3 is a cross-sectional view of a portion of a known metal seal for use in butterfly valves.
Figure 4:
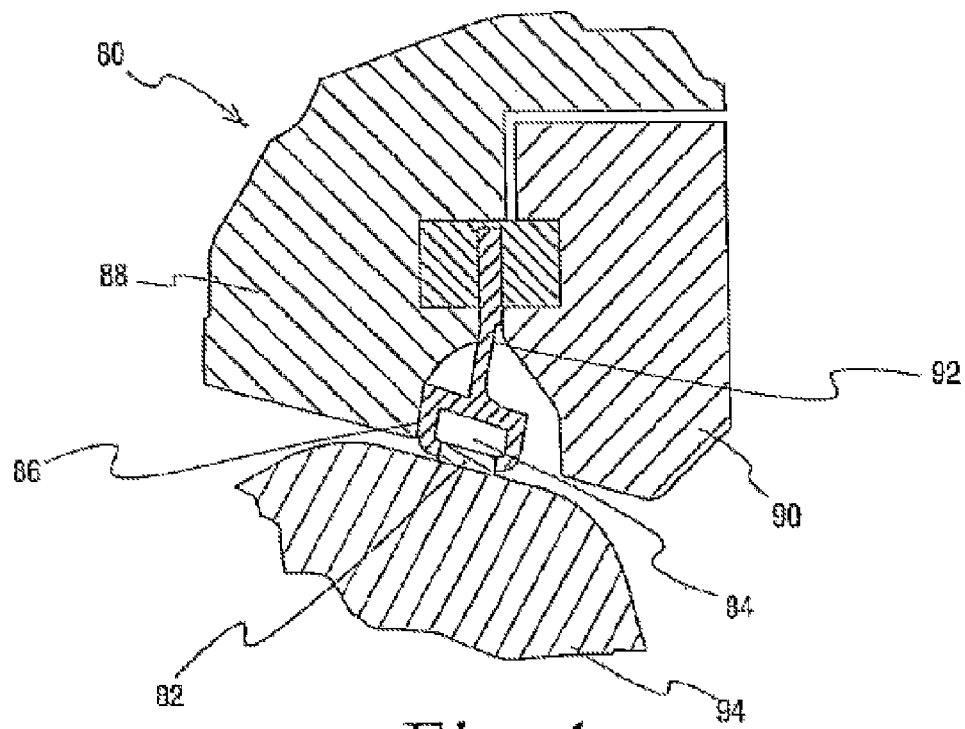
FIG. 4 is a cross-sectional view of a portion of a known butterfly valve seal combining characteristics of a metal seal and a PTFE seal.
Figure 11:
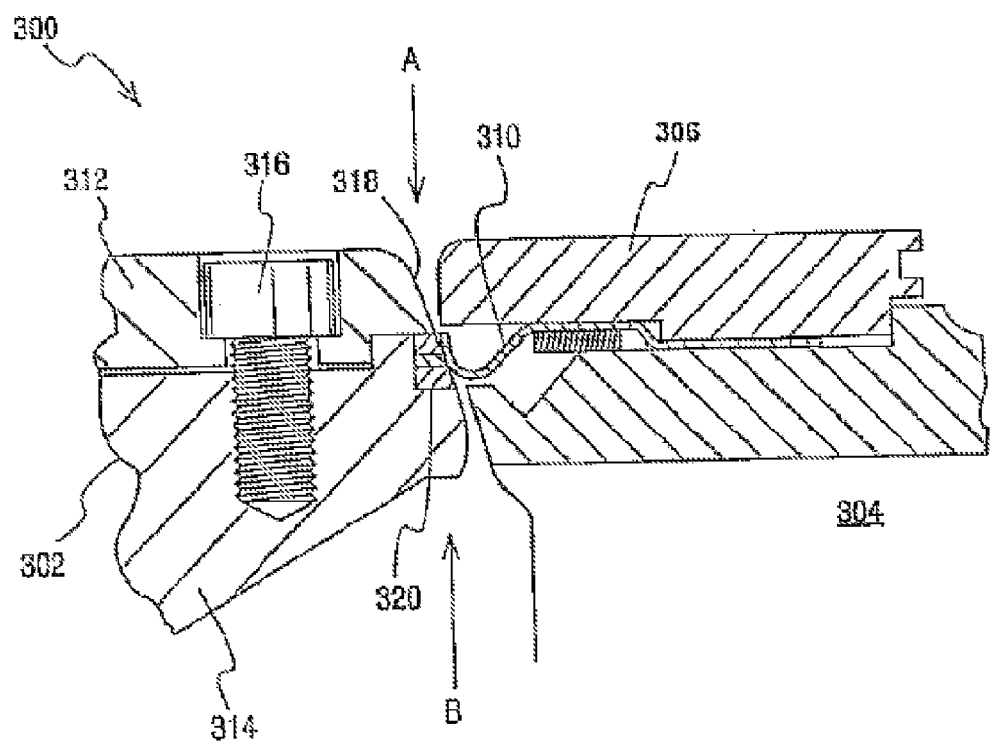
FIG. 11 is a cross-sectional view of a portion of a butterfly valve including an example graphite laminated seal ring on a disc.

FIG. 11 is a cross-sectional view of a portion of an example butterfly valve 300, which may be similar to the valves 100 and 200 described above. As shown in FIG. 3, the butterfly valve 300 includes a disc 302 (e.g., a movable flow control member) at which a relatively high pressure fluid may be presented. The butterfly valve 300 also includes a valve body 304 and a protector ring 306 coupled to the valve body 304. The protector ring 306 retains a flexible seal 310 to form a fluid seal between the disc 302 and the flexible seal 310. The flexible seal 310 may be a stamped metal component similar to the carriers 112, 152, 182, and 210 described above. However, the flexible seal 310 does not support a seal ring in this example but, rather, is used to form a seal against the disc 302.

The disc 302 includes an upper portion 312 and a lower portion 314. The upper 312 and lower 314 portions are coupled or clamped via a mechanical fastener 316 such as, for example, a bolt, or any other mechanical fastener(s). When clamped, the upper 312 and lower 314 portions fit together and form a contoured edge 318. A seal ring 320 is disposed along the contoured edge 318 and between the upper 312 and lower 314 portions of the disc 302.

Figure 12:
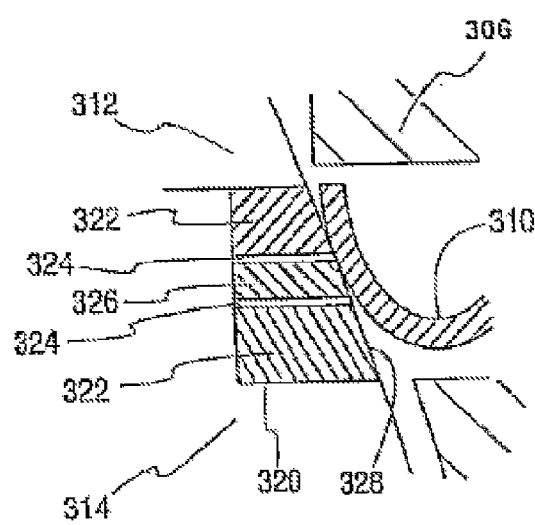
FIG. 12 is an enlarged view of the example seal ring of FIG. 11.

The seal ring 320 is shown enlarged in FIG. 12. As shown in FIG. 12, the seal ring 320 is a layered structure similar to any of the layered structures described above. For example, the outer layers 322 may include a substantially or relatively rigid material such as a metal. In one particular example, the outer layers 322 are made of stainless steel. However, other and/or additional materials could be used instead.

Adjacent to each of the outer layers 322 is a relatively thin layer of expanded graphite 324, which may be implemented using a reinforced carbon fiber material. A central layer 326 is disposed between the graphite layers 324. The central layer 326 may be made of a polymer such as, for example, PTFE to provide lubrication to prevent the transfer of graphite material from the expanded graphite layers 324 to the flexible seal 310 or the like. Though two metal layers 322, two expanded graphite layers 324 and one polymer layer 326 are shown in the example ring of FIGS. 11 and 12, any number and/or combination of the layers 322, 324 and 326 may be used instead.

The layers 322, 324 and 326 of the seal ring 320 are bonded in a manner similar to the layered structures described above. After the layers 322, 324, and 326 are bonded and the load is applied to compress the expanded graphite layers 324, the seal ring 320 is placed between the upper 312 and lower 314 portions of the disc 302. The portions 312 and 314 of the disc 302 are then clamped together with the fastener(s) 316 to secure or clamp the seal ring 320 to the disc 302. The upper 312 and the lower 314 portions support the ring 320 in a manner similar to the manner in which the cartridges 204 and 252 of FIGS. 9 and 10 support their respective seals. The disc 302 and the flexible seal 310 operate and create a seal in a manner similar to disc 102 and the seal 110 described above.

Figure 13:
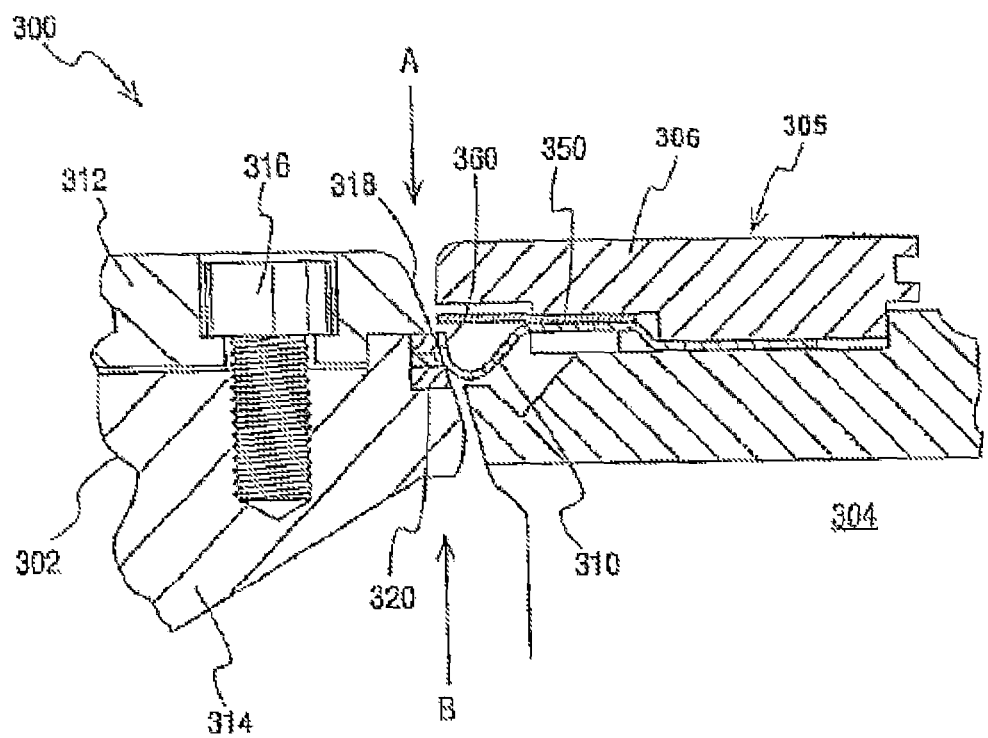
FIG. 13 is a cross-sectional view of a portion of the example butterfly valve of FIG. 11 further including an example seal stiffener.

FIG. 13 illustrates a cross-sectional view of a portion of the butterfly valve 300 with increased stiffness in a reverse flow direction B. As shown in FIG. 13, a sealing structure 305 includes the protector ring 306 of the butterfly valve 300 and a stiffening member 350 adjacent to the flexible seal 310. Though substantially flexible, the stiffening member 350 is configured to increase the stiffness of the flexible seal 310 (i.e., functions as a seal stiffener) in the reverse flow direction B and is further configured to not interfere with the movement of the flexible seal 310 in a forward flow direction A (e.g., the stiffness of the flexible seal 310 is not affected by the stiffening member 350 in the forward flow direction A). As shown in FIG. 13, the example stiffening member or seal stiffener 350 is disposed between the protector ring 306 and the flexible seal 310. In some examples, the seal stiffener 350 may not be fastened to the protector ring 306 and/or the flexible seal 310. For example, the seal stiffener 350 may be captured or clamped between, but not permanently fixed to, the flexible seal 310 and the protector ring 306. As a result, the stiffening member 350 is configured to have one stiffness in the forward flow direction A and another or different stiffness in the reverse flow direction B.

One having ordinary skill in the art will appreciate that a variety of different materials may be used to implement the seal stiffener 350. For example, the seal stiffener 350 may be composed of a similar material to the material used to form the flexible seal 310 and/or may be made of a material that has relatively improved wear and/or corrosion resistance than that of the flexible seal 310. Alternatively, the seal stiffener 350 may also be composed of a material that has less wear resistance than that of the flexible seal 310 because the seal stiffener 350 does not maintain sliding contact with the sealing ring 320, as does the flexible seal 310.

Figure 14:
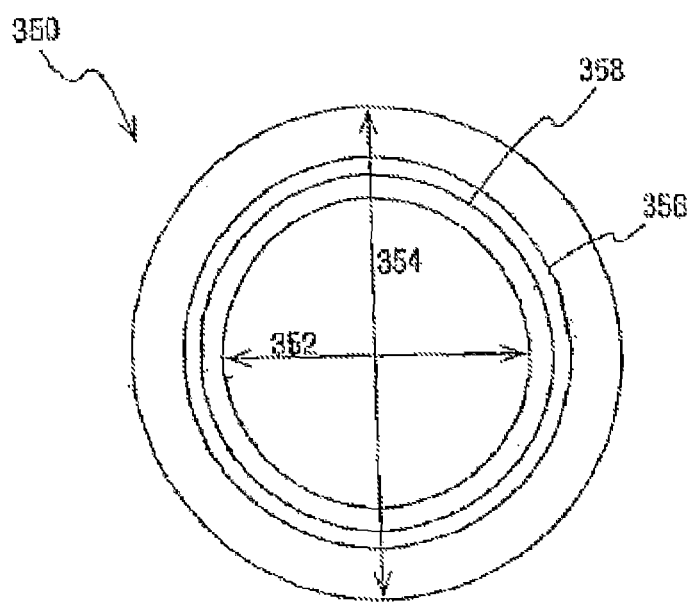
FIG. 14 is a plan view the example seal stiffener depicted in FIG. 13.

As shown in FIG. 14, the seal stiffener 350 may have a washer-like shape with an inner diameter 352 substantially equal to the inner diameter of the flexible seal 310. The seal stiffener 350 may have an outer diameter 354 that is large enough so that the seal stiffener 350 is securely captured between a clamping portion (e.g., the protector ring 306) and the flexible seal 310. The seal stiffener 350 may be substantially planar or may have a contoured profile. The contoured profile may be formed by bends 356 and 358. Additionally, the seal stiffener 350 may be configured to interfere with abrasive media making contact with the flexible seal 310, thereby functioning as a shield to protect the flexible seal 310 from abrasive media.

Alternatively, the seal stiffener 350 may have a plurality of flexible cantilevered members, each of which may have one end captured between the flexible seal 310 and the protector ring 306 and another end extending to at least the tip portion 360 of the flexible seal 310. The plurality of cantilevered members may be uniformly spaced around the circumference of the flexible seal 310 and/or may be spaced around the circumference of the flexible seal 310 in any desired configuration so that the plurality of cantilevered members substantially uniformly increase the stiffness of the entire flexible seal 310 in the reverse flow direction B.

Returning to FIG. 13, as fluid pressure in the reverse flow direction B is applied to the disc 302 in the closed position, the flexible seal 310 is flexed in the reverse flow direction B until the tip portion 360 abuts or contacts the seal stiffener 350. In this manner, the seal stiffener 350 acts as a flexible support for the tip portion 360 of the flexible seal 310. As a result, the seal stiffener 350 increases the stiffness of the flexible seal 310 in the reverse flow direction B to prevent the flexible seal 310 from flexing too far so that the fluid seal between the contoured edge 318 of the disc 302 and flexible seal 310 is not compromised or broken. A component similar to the seal stiffener 350 may also be added to any of the other examples described herein.

In the example valve 300 of FIGS. 11 and 13, the dynamic seal between the flexible seal 310 and the seal ring 320 may utilize hoop stress induced into the flexible seal 310 by the shape of the seal ring 320 and the disc 302 and/or the flexible seal 310 described above with respect to FIG. 5. Further, the seal ring 320 may be designed and manufactured in a manner substantially similar to that described above with respect to the rings 114, 156, and 184 of FIGS. 6-8.

Figure 15:
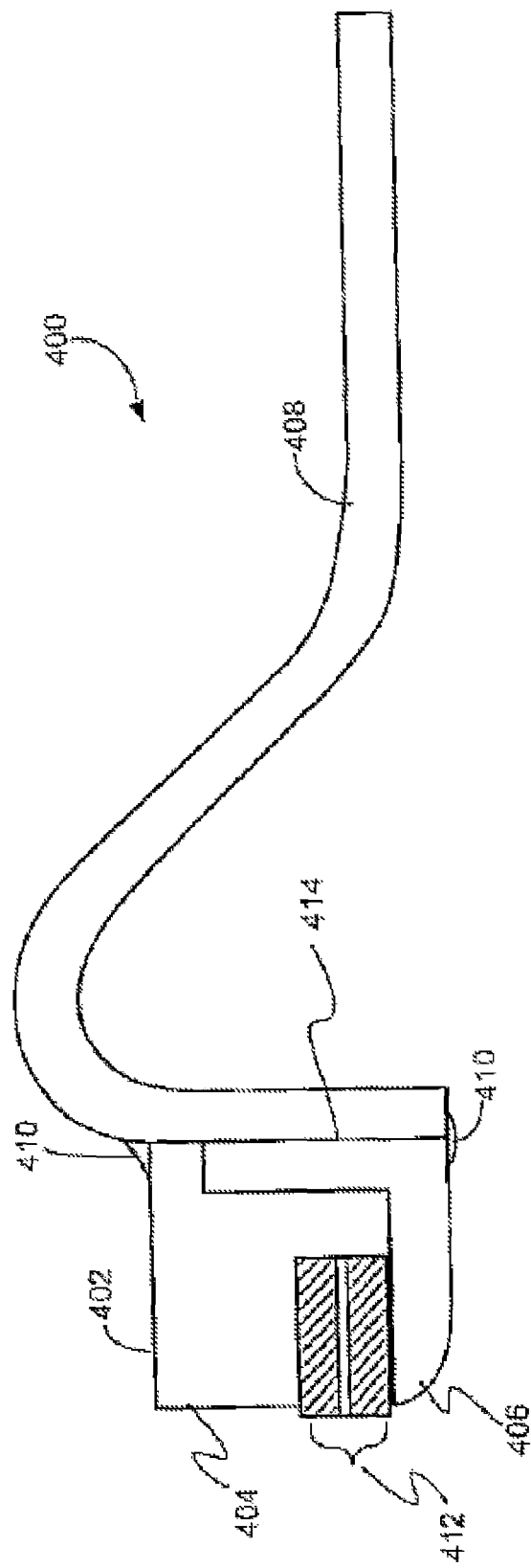
FIG. 15 is a cross-sectional view of another alternative seal ring cartridge and flexible carrier configuration that may be used within a butterfly valve.

FIG. 15 is a cross-sectional view of another alternative seal ring cartridge and flexible carrier configuration 400 that may be used within a butterfly valve. In general, the configuration 400 of FIG. 15 is similar to that shown in FIG. 9. As depicted in FIG. 15, a cartridge 402 having an upper portion 404 and a lower portion 406 are fixed to a flexible carrier 408 via welds (e.g., laser welds) 410. A seal ring 412 is captured between the upper and lower portions 404 and 406. The seal ring 412 may be implemented using any of the layered seal structures described herein. In contrast to the seal/carrier configuration shown in FIG. 9, the cartridge 402 is attached to a flush side 414 of the flexible 408 similar to the manner in which the seal rings 114, 156, and 184 are fixed to their respective carriers 112, 152, and 182.

Figure 16:
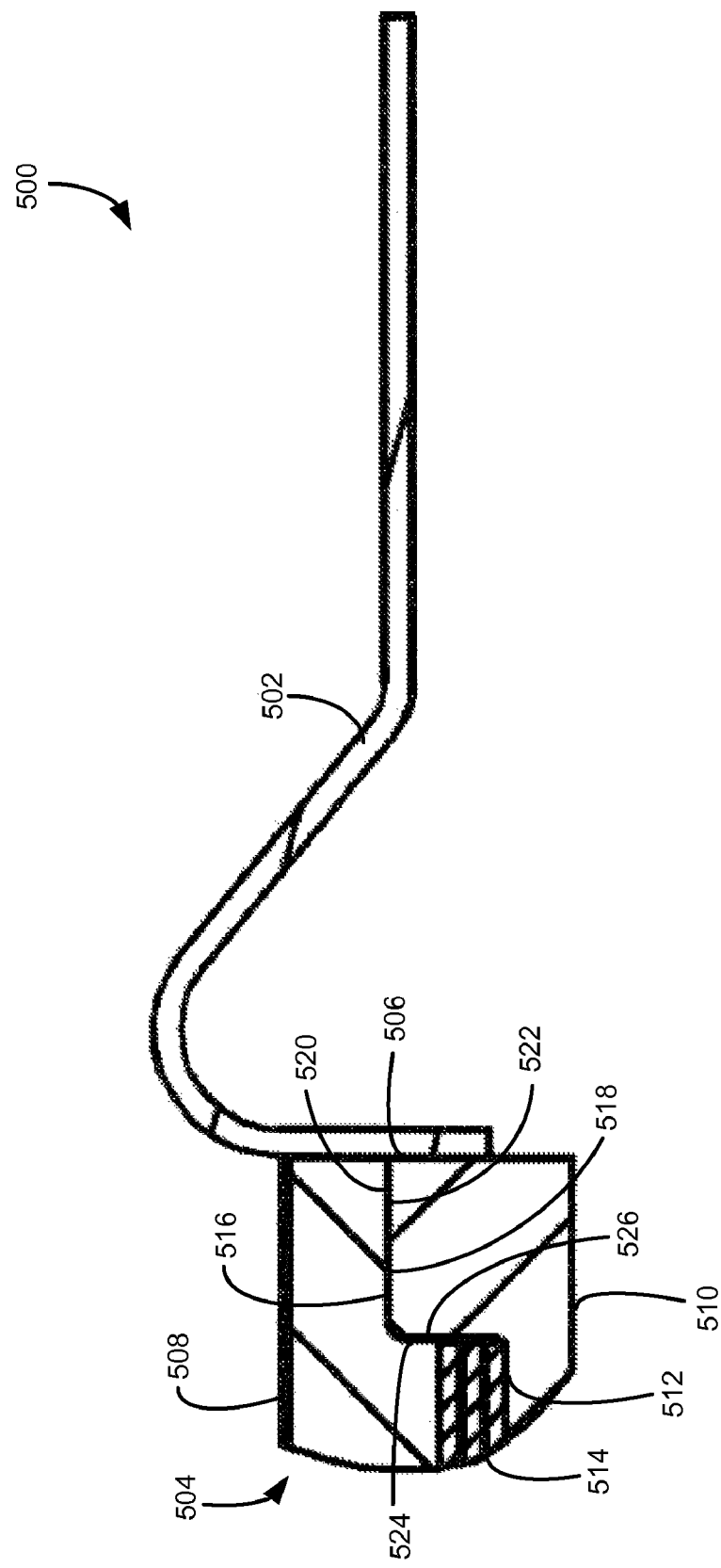
FIG. 16 is a cross-sectional view of another alternative seal ring cartridge and flexible carrier configuration that may be used within a butterfly valve.

FIG. 16 is a cross-sectional view of another alternative seal or seal ring cartridge and flexible carrier configuration 500 that may be used within a butterfly valve. As depicted in FIG. 16, the example seal 500 includes a substantially flexible ring-shaped carrier 502 configured to be fixed within a butterfly valve (e.g., the example valve 100 of FIG. 5) and to surround a flow control aperture therein. Additionally, the example seal 500 includes a ring-shaped cartridge 504 coupled to an inner diameter surface 506 of the ring-shaped carrier 502. The example cartridge 504 includes a first portion 508 and a second portion 510 coupled to the first portion 508 to define a circumferential opening 512 to hold or retain a seal ring 514. The flexible ring-shaped carrier 502 and the seal ring 514 may be implemented in manners similar or identical to the flexible carriers and seal rings described above in connection with FIGS. 5-15. However, as set forth in more detail below, the example cartridge 504 is different in several respects from the cartridges described above in connection with FIGS. 9, 10, and 15.

Turning in detail to the example cartridge 504 depicted in FIG. 16, the first portion 508 has a first inwardly facing surface 516 and the second portion 510 has a second inwardly facing surface 518 to engage the first inwardly facing surface 516. The inwardly facing surfaces 516 and 518 include respective radially oriented portions or radial surfaces 520 and 522. The radially oriented portions or radial surfaces 520 and 522 lie in a plane or planes that are generally or substantially perpendicular to the longitudinal axis of the ring-shaped seal 500. As used herein, the language "radial surfaces" includes surfaces that are at least approximately perpendicular to the longitudinal axis of a ring-shaped member (e.g., the seal 500). The inwardly facing surfaces 516 and 518 also include axially oriented portions or axial surfaces 524 and 526, which lie in a plane or planes that are generally or substantially parallel to the longitudinal axis of the example seal 500. As used herein, the language "axial surfaces" includes surfaces that are at least approximately parallel to the longitudinal axis of the example seal 500.

Figure 17:
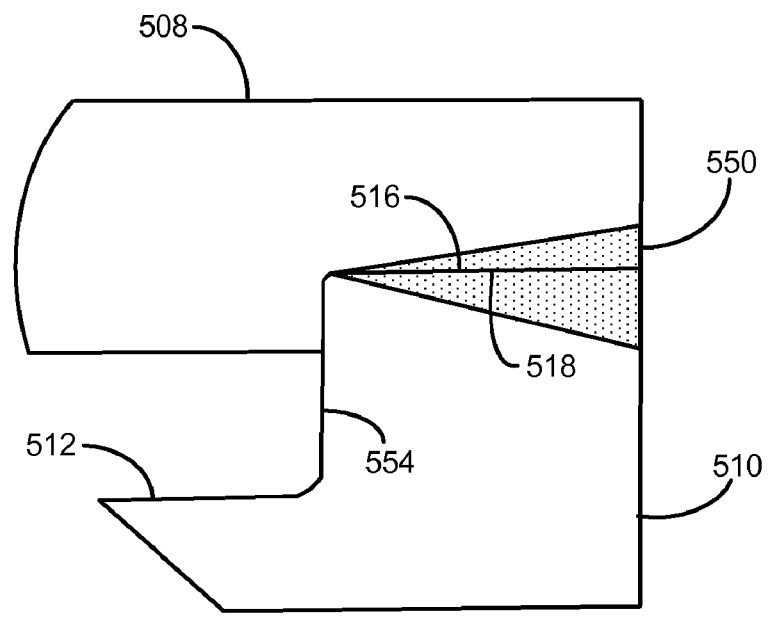
FIG. 17 depicts an example radial weld that may be used to implement the example cartridge of FIG. 16.
Figure 18:
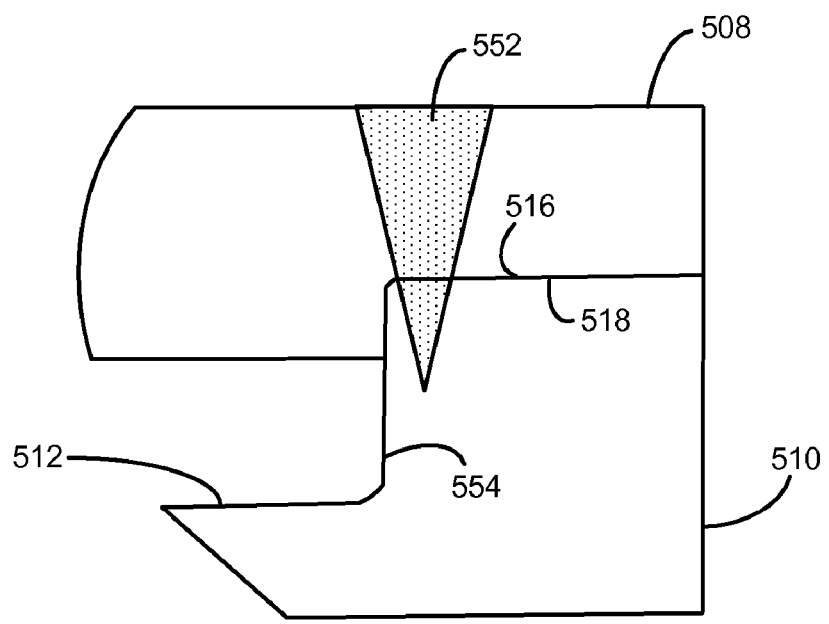
FIG. 18 depicts an example axial weld that may be used to implement the example cartridge of FIG. 16.

The first and second portions 508 and 510 may be coupled together via at least portions of the inwardly facing surfaces 516 and 518 using, for example, a weld or welds (e.g., laser welds), which fuse together at least portions of the inwardly facing surfaces 516 and 518. An example radial weld 550 is shown in FIG. 17 and an example axial weld 552 is depicted in FIG. 18. The welds 550 and 552 may continuously and completely circumvent the ring-shaped cartridge 504 or, alternatively, may be a plurality of discontinuous welds spaced about the ring-shaped cartridge 504. As depicted in FIGS. 17 and 18, the welds 550 and 552 fuse together at least portions of the inwardly facing surfaces 516 and 518 that are substantially adjacent an axial wall 554 defining the opening 512. By using a weld or welds in a location that fuses the surfaces 516 and 518 substantially adjacent the axial wall 554, the cartridge 504 can apply and maintain a desired retention load to the seal ring 514. In particular, the cartridge 504 and the welds 550 and 552 depicted in FIGS. 16, 17, and 18 minimize or substantially eliminate the possibility of the first and second portions 508 and 510 from being spaced or spread apart by the expanding forces (e.g., the reactionary load) of seal ring 514, which is captured between by the portions 508 and 510. In other words, the torque or force that the reactionary load imparted by the seal ring 514 to the portions 508 and 510, which are welded or fused together, is significantly reduced or minimized for weld locations that are proximate or substantially adjacent to the axial wall 554 and, thus, the seal ring 514 (i.e., the source of the reactionary force generating the torque).

Similar to the example cartridge 402, the example cartridge 504 may be coupled or attached to the substantially flexible carrier 502 via one or more welds or any other suitable method. However, in contrast to the example cartridge 402, the radial surfaces 520 and 522 have more engaged surface area than the axial surfaces 524 and 526. As can be most clearly seen in FIGS. 17 and 18, having a relatively larger engagement area between the radial portions 520 and 522 of the inwardly facing surfaces 516 and 518 enables or facilitates fusing or joining of the portions 508 and 510 substantially adjacent the wall 554 and eliminates the need to use an interference fit between the inwardly facing surfaces 516 and 518 of the portions 508 and 510 such as that described in connection with the example cartridges 204 and 402 of FIGS. 9 and 15, respectively.

While the inwardly facing surfaces 516 and 518 are depicted as having substantially radially oriented and substantially axially oriented portions other configurations and/or orientations for the inwardly facing surfaces 516 and 518 could be used instead. For example, the inwardly facing surfaces 516 and 518 may be angled so that some portion(s) or the entire surfaces 516 and 518 are angled to be neither perpendicular nor parallel to the longitudinal axis of the seal 500. Alternatively or additionally, the inwardly facing surfaces 516 and 518 may have a non-rectilinear (e.g., curved) profile such that the surfaces 516 and 518 are complementary.

Figure 19:
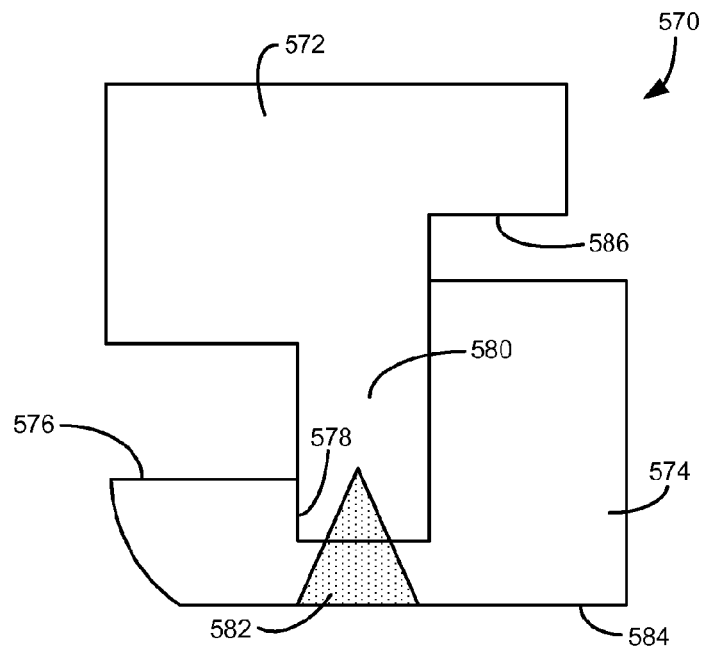
FIG. 19 is a cross-sectional view of another example cartridge configuration that may be used to implement the example seals described herein.

FIG. 19 is a cross-sectional view of another example cartridge configuration 570 that may be used to implement the example seals described herein. The example cartridge 570 includes a first portion 572 and a second portion 574 that is coupled to the first portion 572 to define an opening 576 that retains a seal ring (e.g., the seal ring 514 of FIG. 16). The second portion 574 includes a radial slot, groove, or channel 578 that receives an axially projecting portion or axial projection 580. The first and second portions 572 and 574 are coupled together via a weld 582, which extends through a lower surface 584 of the second portion 574 into the axial projection 580. The example cartridge 570 also provides a second opening or channel 586 to receive an end of a flexible ring-shaped carrier (e.g., similar to the example carrier 210 of FIG. 9). During assembly, the slot, groove, or channel 578 substantially eliminates graphite material (e.g., from a seal ring captured in the opening 576) or other similar contaminates from contaminating the surfaces to be fused or welded.

Figure 20:
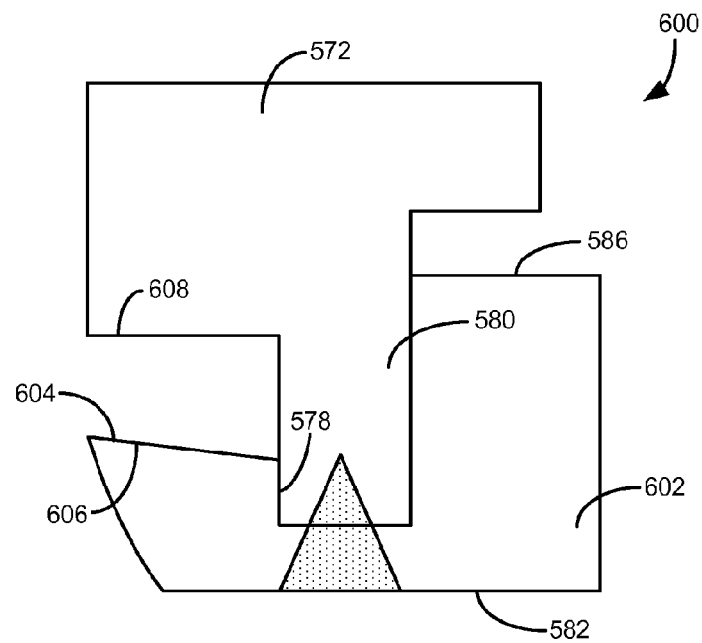
FIG. 20 is cross-section view of yet another example cartridge configuration that may be used to implement the example seals described herein.

FIG. 20 is cross-section view of yet another example cartridge configuration 600 that may be used to implement the example seals described herein. Certain components or features of the example cartridge 600 are similar or identical to those of the example cartridge 570 of FIG. 19 and those similar or identical components or features are referenced using the same reference numbers. Similar to the example cartridge 570 of FIG. 19, the example cartridge 600 has a portion 602 that, when coupled to the first portion 572, defines an opening 604 to receive a seal (e.g., the example seal 514 of FIG. 16). In contrast to the opening 576 of the example cartridge 570 of FIG. 19, the opening 604 has sloped or substantially non-parallel radial surfaces or sides 606 and 608. The sloped or substantially non-parallel surfaces or sides 606 and 608 enable a seal to be retained in the opening 604 to be loaded to cause the portions 572 and 602 to yield (e.g., move away from one another), thereby enabling the portions 572 and 602 to provide a consistent loading on a seal ring or seal rings and across cartridges.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A seal for use in a butterfly valve, the seal comprising:
a flexible carrier to surround a flow control aperture;
a cartridge having an outer circumferential surface coupled to an inner diameter surface of the flexible carrier, the cartridge including a first portion and a second portion coupled to the first portion, the first and second portions defining an opening; and
a seal ring disposed within the opening of the cartridge to form a seal between the flexible carrier and a flow control member disposed within the flow control aperture the seal ring being indirectly coupled to the flexible carrier by the cartridge, the seal ring having a first layer of a first material and a second layer of a second material.

2. The seal of claim 1, wherein the first and second layers are substantially parallel to a diametral plane of the flow control aperture.

3. The seal of claim 1, wherein the inner diameter surface is substantially parallel to a longitudinal axis of the flow control aperture.

4. The seal of claim 1, wherein the first material is a metal and the second material is a polymer.

5. The seal of claim 1, wherein the seal ring further includes a third layer of a third material.

6. The seal of claim 5, wherein the third layer is disposed between the first and second layers, and wherein the third material is graphite.

7. The seal of claim 1, wherein the flexible carrier includes a curved profile.

8. The seal of claim 1, wherein the flexible carrier includes an outer diameter surface, the outer diameter surface on an opposite side of the flexible carrier than the inner diameter surface.

9. The seal of claim 1, wherein the first portion and the second portion are in contact with the flexible carrier and extend inward toward a center of the flow control aperture.

10. The seal of claim 1, wherein the first layer is coupled to the first portion and the second layer is coupled to the second portion.

11. The seal of claim 10, wherein the second layer is further coupled to the first portion.

* * * * *

UNITED STATES PATENT AND TRADEMARK OFFICE
CERTIFICATE OF CORRECTION

PATENT NO. : 9,587,747 B2  Page 1 of 1
APPLICATION NO. : 14/842281
DATED : March 7, 2017
INVENTOR(S) : Jonathon Helfer Wade et al.

It is certified that error appears in the above-identified patent and that said Letters Patent is hereby corrected as shown below:

In the Claims

Column 12, Lines 23-24 (Claim 1): Replace "aperture the seal" with --aperture, the seal--.

Signed and Sealed this
Twenty-third Day of May, 2017

Michelle K. Lee
*Director of the United States Patent and Trademark Office*